April 18, 1939. W. L. McGRATH 2,154,858
AIR CONDITIONING SYSTEM
Filed May 14, 1938 2 Sheets-Sheet 1

Inventor
William L. McGrath
By George H Fisher
Attorney

April 18, 1939.  W. L. McGRATH  2,154,858
AIR CONDITIONING SYSTEM
Filed May 14, 1938  2 Sheets-Sheet 2

Inventor
William L. McGrath
By
George H Fisher
Attorney

Patented Apr. 18, 1939

2,154,858

UNITED STATES PATENT OFFICE 2,154,858

AIR CONDITIONING SYSTEM

William L. McGrath, St. Paul, Minn., assignor to Minneapolis-Honeywell Regulator Company, Minneapolis, Minn., a corporation of Delaware Application May 14, 1938, Serial No. 208,089

12 Claims. (Cl. 62—6)

This invention relates to an air conditioning system and more particularly to a system for removing sensible and latent heat from a space in accordance with the requirements of the space.

In accordance with my invention, air is circulated over the evaporator coil of a refrigeration system and through the space or spaces to be conditioned. The evaporator coil temperature is controlled according to whether the temperature or the humidity of the space should be lowered in order to maintain satisfactory conditions in the space. In cases where the temperature of the space only is too high the temperature of the evaporator will be maintained at a higher value than is the case where dehumidification is required. It is well known that in order to dehumidify the air, more heat must be removed from the air than is the case where a reduction in temperature of the space is required since in order to dehumidify, sensible heat and also latent heat must be removed from the air and it is therefore advisable to maintain a lower evaporation temperature when dehumidification is required than where only a reduction in temperature is required. Under certain conditions however the temperature of the space may be so high or in other words, the sensible cooling load of the evaporator may be so great that the evaporator operating at the higher temperature is unable to reduce the temperature the required amount and in such cases even though the humidity of the space is at the desired value the evaporator may be operated at the lower temperature. In order to control the evaporator in this manner, I have provided a pair of controls responsive to different suction pressures on the suction side of the refrigeration system, one of these controls controlling the compressor upon an initial increase in temperature of the space to maintain a relatively high suction pressure in the evaporator, and the other suction pressure controller controlling the compressor to maintain a lower suction pressure and accordingly a lower coil temperature when the temperature in the space reaches an excessively high value or when the humidity in the space becomes excessive.

It is therefore an object of my invention to provide a novel control system for the evaporator coil of a refrigeration system in order to control the coil temperature in accordance with the cooling requirements thereof.

Other objects will become apparent upon reference to the specification, claims, and appended drawings wherein like reference characters represent like parts in the two views and wherein:

Figure 1:
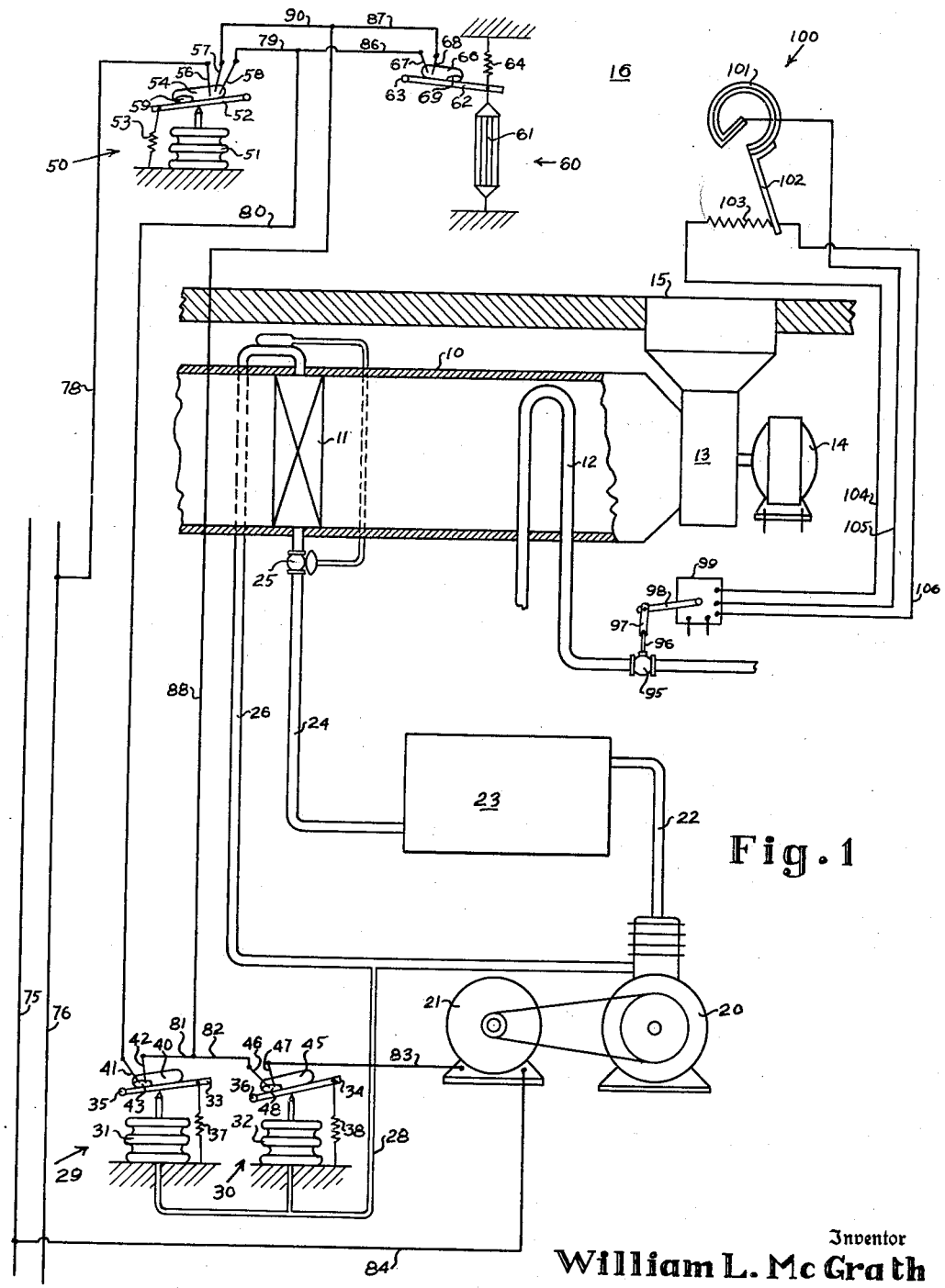
Figure 1 is a schematic view of one form of system embodying my invention.

Referring more specifically to Figure 1, an air conditioning chamber is represented by the reference character 10. Located within this chamber is the evaporator 11 of a refrigeration system to be described. A heating coil 12 may be located in the chamber 10 and a fan 13 driven by means of a motor 14 is provided for drawing air over the coils 11 and 12 and discharging the air from an outlet 15 into the space 16 to be conditioned. The air entering the chamber 10 may be fresh or outside air or a mixture of fresh and return air and the supply of air to the chamber 10 may be controlled in any suitable manner.

The refrigeration system of which the evaporator 11 forms a part also includes a compressor 20 driven by a motor 21 which is controlled in a manner to be hereinafter described. Compressed refrigerant is discharged from the compressor 20 and flows through a pipe 22 into a condenser 23 whence the refrigerant flows through a pipe 24 through an expansion valve 25 which may be of any suitable well known construction and into the evaporator 11. The evaporated refrigerant then flows through a pipe 26 back to the inlet of the compressor 20. Connected to the suction side of the refrigeration system by means of a pipe 28 are suction pressure controllers 29 and 30. These controllers comprise bellows 31 and 32, respectively, and cooperating therewith are levers 33 and 34 pivoted at 35 and 36 and biased by means of springs 37 and 38 into engagement with the upper portion of the bellows 31 and 32, respectively. Lever 33 carries a mercury switch 40, this switch including contacts 41 and 42 and a mercury element 43. Similarly the lever 34 of the controller 30 carries a mercury switch 45, this switch including contacts 46, 47 and mercury element 43. As the pressure on the suction side of the system drops, the bellows 31 and 32 contract and the levers 33 and 34 move downwardly under the action of the biasing springs 37 and 38. When the pressure has dropped to a low enough value the switches carried by the levers are tilted in the other direction thus interrupting the circuit through the respective contacts thereof. These switches are set to open at different suction pressures, for example, the switch 40 may open when the suction pressure drops to 40 pounds, for example, and the switch 45 may remain in the closed position until the suction pressure has dropped to 25 pounds, for example.

Mounted within the space being conditioned is a temperature responsive device 50. This device may include a bellows 51 containing a volatile fill whereupon the bellows expands or contracts in accordance with temperature variations in the space. Cooperating with the bellows 51 is a lever 52 biased by means of a spring 53 into engagement with the upper portion of the bellows and a mercury switch 54 is carried by the lever 52. This switch 54 includes three contacts 56, 57, and 58 and a mercury element 59. It will be noted that the contacts 56, 57, and 58 are of different lengths and are so arranged that as the temperature in the space increases and the switch 54 begins to tilt in the opposite direction from that shown, the mercury element 59 will first bridge the contacts 56 and 58 but will not engage the contact 57 at first because this contact does not extend into the tube as far as the other contacts. As the temperature in the space continues to rise however the tube will be tilted further in the other direction and after the temperature reaches a predetermined value, the mercury will also engage the contact 57 and all the contacts will be bridged by the mercury element 59.

Also mounted in the space 16 is a humidity responsive device 60 which may be of any well known construction and is shown as comprising a humidity responsive element 61 which is anchored at its lower end to a suitable supporting structure and is connected at its upper end to a lever 62 pivoted at 63 and biased upwardly by means of a spring 64. An increase in humidity of the air surrounding the element 61 causes this element to expand causing the lever 62 to move upwardly under the influence under the spring 64. As the humidity in the space decreases, the element 61 contracts and causes the lever 62 to move downwardly. Carried by the lever 62 is a mercury switch 66 including contacts 67, 68 and a mercury element 69. It will be apparent that as the humidity in the space reaches a predetermined value the switch 66 will be tilted to a position wherein the contacts 67 and 68 are bridged by the mercury element 69.

Line wires 75 and 76 are provided for supplying power to the motor 21, these line wires being connected to a suitable source of power (not shown). When the temperature in the space is at the desired value, the mercury switch 54 will be tilted to a position wherein none of the contacts thereof are bridged by the mercury element. Upon an increase in temperature in the space however, to an undesirable value, the contacts 56 and 58 will first be bridged by the mercury element 59. This causes the motor 21 to be energized through the following circuit: from the line wire 76 through conductor 78, terminals 56 and 58 of the switch 54, conductors 79, 80, switch 40 of the suction pressure controller 29, conductors 81, 82, the switch 45 of the suction pressure controller 30, conductor 83, motor 21, and conductor 84 to the line wire 75. Operation of the motor 21 causes operation of the compressor 20 whereupon the temperature of the evaporator begins to decrease thus removing heat from the air being circulated thereover and through the space 16. It should be noted that both switches 40 and 45 of the suction pressure controllers are connected in series with the motor 21 and the switch 54 of the temperature responsive device 50. Accordingly should the pressure on the suction side of the system drop to the setting of the controller 29, as, for example, 40 pounds, the switch 40 will be moved to circuit breaking position whereupon the motor 21 will stop. Since the suction pressure is an indication of the evaporator temperature it will be seen that upon an initial call for cooling within the space, assuming the humidity therein to be at a desirable value, the compressor 20 will be operated only long and often enough to maintain a predetermined evaporator temperature until the space temperature drops to the desired value. In this way the heat removed from the air will be largely sensible heat which is all that is required since there is no call for dehumidification.

Assuming now that the above described circuit through the compressor motor 21 is completed by reason of a need for cooling within the space, and the humidity therein rises to an undesirable value, the mercury switch 66 will be tilted to a position wherein the contacts 67 and 68 are bridged by the mercury element 69. There will now be a circuit through the motor 21 which is independent of the switch 40, this circuit being as follows: from the line wire 76 through conductor 78, contacts 56 and 58 of the switch 54, conductors 79, 86, switch 66, conductors 87, 88, 82, switch 45, conductor 83 through the motor 21 and conductor 84 to the line wire 75. Switch 40 is now shunted out of the controlling circuit for the motor 21 and the motor will now operate to maintain a suction pressure corresponding to the setting of the controller 30, as, for example, a pressure of 25 pounds or in other words, a lower coil temperature at the evaporator 11. By reason of this lower coil temperature a large part of the heat removed from the air will be latent heat thus affecting a reduction of humidity in the space 16. The compressor 20 will now operate to maintain this lowered coil temperature as long as the humidity is excessive and the temperature is high enough so that contacts 56 and 58 of the switch 54 are connected.

Assuming now that the humidity in the space is at a desired value but the temperature continues to increase until all of the contacts in the switch 54 are bridged by the mercury element 59. Since there is now an increased demand for cooling within the space it may be desirable to maintain a lower evaporator temperature even though there is no need for dehumidification. The movement of the switch 54 to this new position closes a circuit to the motor 21 which shunts out the switch 40, this circuit being as follows: from the line wire 76 through conductor 78, contacts 56 and 57 of the switch 54, conductors 90, 88, 82, switch 45, conductor 83, motor 21, and conductor 84 to the line wire 75. It will thus be seen that when the space temperature reaches an excessively high value that the compressor 20 will operate to maintain the lower coil temperature.

In certain cases where the evaporator 11 is being used for dehumidification, the temperature of the air may fall to an undesirable value and in that case the coil 12 is used for reheating the air passing over the evaporator coil. The flow of a heating fluid such as steam through the coil 12 may be controlled by a valve 95, the valve stem 96 of which is connected by means of a link 97 to the operating arm 98 of a motor 99. This motor may be a proportioning motor of the type illustrated in Patent 2,028,110 issued to D. G. Taylor on January 14, 1936. The operation of this motor may be controlled by a thermostat 100 located in the space being conditioned. This thermostat is shown to comprise a bimetallic element 101 carrying an arm 102 for movement over resistance 103 in response to variations in temperature in the space 16. Conductors 104, 106, and 105 connect the motor 99 to the ends of resistance 103 and the bimetallic element 101 of the thermostat respectively. When the temperature in the space is at or above the desired value the arm 102 will be at the extreme right end of the resistance 103 and the motor 99 will hold the valve 95 in closed position. Should the temperature of the air in the space drop below the desired value, the arm 102 will start to move towards the left over the resistance 103 and cause motor 99 to operate and open the valve 95 an amount which is proportional to the drop in temperature as will be understood upon reference to the above mentioned Taylor patent. In this way sufficient heat will be supplied by the coil 12 to prevent the temperature in the space 16 from dropping below the desired value.

Figure 2:
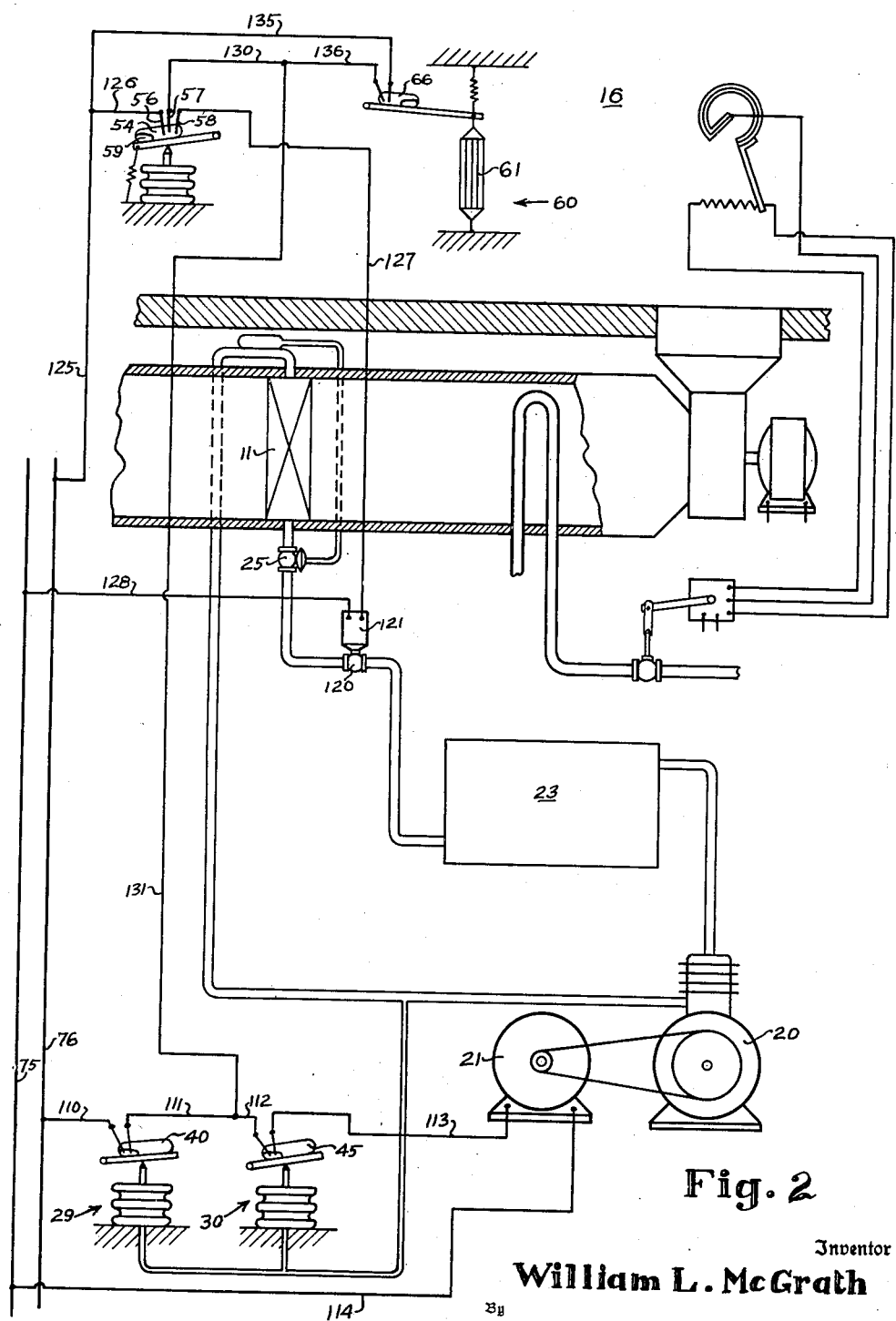
Figure 2 is a modification of the system illustrated in Figure 1.

Referring now to Figure 2 an air conditioning system similar to Figure 1 is illustrated. The compressor motor 21 in this case however is controlled solely by the suction pressure controllers 29 and 30 to at all times maintain a certain suction pressure in the refrigeration system. The operating circuit for the motor 21 is as follows: from the line 76 through conductors 110, mercury switch 40, conductors 111, 112, mercury switch 45, conductor 113, motor 21, and conductor 114 to the line wire 75. It will thus be seen that the motor 21 will be operated at all times to maintain a suction pressure at least as low as the setting of the suction pressure controller 29 which may be, for example, 40 pounds.

Interposed between the condenser 23 and the expansion valve 25 is a second valve 120 which may be operated by a solenoid 121. Energization of the solenoid 121 causes the valve 120 to move to open position and upon deenergization of the solenoid the valve moves to closed position either by gravity or by means of a suitable biasing means, not illustrated. This valve remains closed as long as the temperature in the space 16 has not risen to an undesirable value so that no refrigerant is circulated through the evaporator coil 11 but a predetermined suction pressure is maintained in the refrigeration system. Upon an initial rise in temperature to a predetermined value the contacts 56 and 58 of the switch 54 will be bridged by the mercury element 59 as in Figure 1, thus energizing the solenoid 121 through the following circuit: from the line 76 through conductors 125, 126, contacts 56 and 58, conductor 127, solenoid 121, and conductor 128 to the line wire 75. The energization of the solenoid 121 causes the opening of valve 120 whereupon refrigerant flows through the evaporator 11 under the control of the expansion valve 25 and the compressor motor 21 operates the compressor to maintain a suction pressure as controlled by the controller 29 and accordingly maintains a predetermined evaporator temperature.

If now the temperature rises to a still higher value so that all the contacts of the mercury switch 54 are bridged motor 21 will be energized through the following circuit which is independent of the switch 40 as follows: from the line wire 76 through conductors 125, 126, contacts 56, 57, conductors 130, 131, 112, switch 45, conductor 113, motor 21, and conductor 114 to the line wire 75. The compressor 20 will now operate to maintain a lower suction pressure and therefore a lower evaporator temperature in the evaporator coil 11 as in Figure 1.

Should now the humidity rise high enough so that switch 66 is tilted in the opposite direction but the temperature is at the first predetermined value so that only contacts 56 and 58 thereof are bridged with the mercury element 59, the motor 21 will be energized by the following circuit: from line 76 through conductors 125, 135, switch 66, conductors 136, 131, 112, switch 45, conductor 113, motor 21, and conductor 114 to the line wire 75. The evaporator 11 will now be operated at its lower coil temperature in the same way as in Figure 1.

Upon the temperature in the space dropping to the predetermined value the valve 120 will be closed thus preventing further flow of refrigerant to the evaporator 11 and the compressor motor 21 will be controlled by the suction pressure controller 29 to maintain the higher suction pressure. In this manner the suction pressure will always be maintained as low as the setting of the controller 29 and accordingly upon a call for cooling within the space and the opening of the valve 120 the temperature of the evaporator 11 will be lowered. Reheat means similar to that shown in Figure 1 are illustrated for reheating the air upon dehumidification if necessary.

It will thus be seen that with both of the systems illustrated the temperature and the humidity of the space are effectively controlled, the evaporator temperature being controlled in accordance with the need for a large or a small amount of sensible cooling and also in accordance with requirements for removal of latent heat from the air.

Having described preferred forms of my invention, many modifications may become apparent to those skilled in the art and I wish it to be understood that my invention is limited only by the scope of the appended claims.

I claim as my invention:

1. In a system of the class described, refrigerating apparatus including a compressor and an evaporator, a first suction pressure controller, a second suction pressure controller, means responsive to a first condition of the air being cooled by the evaporator for placing the compressor under the control of the first suction pressure controller, and means responsive to a second condition of the air being cooled by the evaporator for placing the compressor under the control of the second suction pressure controller.

2. In a system of the class described, refrigerating apparatus including a compressor and an evaporator, a plurality of control circuits for said compressor, one of said circuits interrupting the operation of the compressor when the pressure on the suction side of the compressor drops to a predetermined value, the other of said circuits interrupting the operation of the compressor when the pressure on the suction side of the compressor drops to a lower predetermined value, and condition responsive means for selectively placing the compressor under the control of one or the other of said control circuits.

3. In a system of the class described, refrigerating apparatus including a compressor and an evaporator, means responsive to the attainment of a predetermined temperature of the air being cooled by the evaporator for initiating operation of the compressor, means responsive to the attainment of a low pressure on the suction side of the compressor for interrupting operation thereof, and means responsive to the attainment of a still higher predetermined temperature of the air being cooled by the evaporator for lowering the suction pressure at which interruption of the compressor operation takes place.

4. In a system of the class described, refrigerating apparatus including a compressor and an evaporator, means responsive to the attainment of a predetermined temperature of the air being cooled by the evaporator for initiating operation of the compressor, means responsive to the attainment of a low pressure on the suction side of the compressor for interrupting operation thereof, and means responsive to the attainment of a predetermined high humidity of the air being cooled by the evaporator for lowering the suction pressure at which interruption of the compressor operation takes place.

5. In a system of the class described, refrigerating apparatus including a compressor and an evaporator, means responsive to the attainment of a predetermined temperature of the air being cooled by the evaporator for initiating operation of the compressor, means responsive to a condition indicative of a low evaporator temperature for interrupting operation of the compressor, means responsive to the attainment of a still higher predetermined temperature of the air being cooled by the evaporator, and means under the control of said last named means for causing operation of the compressor until the attainment of a condition indicative of a lower evaporator temperature.

6. In a system of the class described, refrigerating apparatus including a compressor and an evaporator, means responsive to the attainment of a predetermined temperature of the air being cooled by the evaporator for initiating operation of the compressor, means responsive to a condition indicative of a low evaporator temperature for interrupting operation of the compressor, means responsive to the attainment of a high predetermined humidity of the air being cooled by the evaporator, and means under the control of said last named means for causing operation of the compressor until the attainment of a condition indicative of a lower evaporator temperature.

7. An air conditioning system including a refrigerating apparatus having a compressor and an evaporator, means for circulating air over the evaporator and through a space being conditioned, means responsive to the attainment of a high predetermined temperature in the space being conditioned for initiating operation of the compressor, a pair of devices responsive to different pressures on the suction side of the compressor in series with said temperature responsive means for terminating operation of the compressor when the suction pressure drops to the setting of the device responsive to the highest suction pressure, and means responsive to the attainment of a higher predetermined temperature in the space for shunting out said last named device.

8. An air conditioning system including a refrigerating apparatus having a compressor and an evaporator, means for circulating air over the evaporator and through a space being conditioned, means responsive to the attainment of a high predetermined temperature in the space being conditioned for initiating operation of the compressor, a pair of devices responsive to different pressures on the suction side of the compressor in series with said temperature responsive means for terminating operation of the compressor when the suction pressure drops to the setting of the device responsive to the highest suction pressure, and means responsive to the attainment of a high predetermined humidity in the space for shunting out said last named device.

9. In a system of the class described, refrigerating apparatus including a compressor and an evaporator, a pair of devices responsive to a condition indicative of different evaporator temperatures selectively controlling the operation of the compressor, the device responsive to a condition indicative of the higher evaporator temperature being normally in control of said compressor, a valve for controlling the flow of refrigerant into the evaporator, means responsive to the attainment of a high predetermined temperature of the air being cooled by the evaporator for opening said valve, and means responsive to the attainment of a still higher predetermined temperature of the air being cooled by the evaporator for placing the compressor under the control of the device responsive to a condition indicative of the lower evaporator temperature.

10. In a system of the class described, refrigerating apparatus including a compressor and an evaporator, a pair of devices responsive to a condition indicative of different evaporator temperatures selectively controlling the operation of the compressor, the device responsive to a condition indicative of the higher evaporator temperature being normally in control of said compressor, a valve for controlling the flow of refrigerant into the evaporator, means responsive to the attainment of a high predetermined temperature of the air being cooled by the evaporator for opening said valve, and means responsive to the attainment of a high humidity of the air being cooled by the evaporator for placing the compressor under the control of the device responsive to a condition indicative of the lower evaporator temperature.

11. In an air conditioning system, refrigerating apparatus including a compressor and an evaporator, means for circulating air over the evaporator and through a space to be conditioned, means for controlling the operation of the compressor including a pair of serially arranged circuit controlling devices which open in response to the attainment of different predetermined pressures on the suction side of the compressor, valve means controlling the flow of refrigerant into the evaporator, means responsive to the attainment of a high predetermined temperature in the space being conditioned for opening said valve means, and means responsive to the attainment of a still higher predetermined temperature in the space being conditioned for shunting out the circuit controlling device which opens in response to the attainment of the higher pressure on the suction side of the compressor.

12. In an air conditioning system, refrigerating apparatus including a compressor and an evaporator, means for circulating air over the evaporator and through a space to be conditioned, means for controlling the operation of the compressor including a pair of serially arranged circuit controlling devices which open in response to the attainment of different predetermined pressures on the suction side of the compressor, valve means controlling the flow of refrigerant into the evaporator, means responsive to the attainment of a high predetermined temperature in the space being conditioned for opening said valve means, and means responsive to the attainment of a predetermined high humidity in the space being conditioned for shunting out the circuit controlling device which opens in response to the attainment of the higher pressure on the suction side of the evaporator.

WILLIAM L. McGRATH.